US008047601B2

(12) United States Patent
Malina et al.

(10) Patent No.: US 8,047,601 B2
(45) Date of Patent: Nov. 1, 2011

(54) PROTECTIVE VEHICLE COVER

(76) Inventors: Ronny Malina, New York, NY (US);
Eric Malina, Nanuet, NY (US)

( * ) Notice: Subject to any disclaimer, the term of this patent is extended or adjusted under 35 U.S.C. 154(b) by 0 days.

(21) Appl. No.: 12/959,604

(22) Filed: Dec. 3, 2010

(65) Prior Publication Data
US 2011/0068592 A1    Mar. 24, 2011

Related U.S. Application Data

(63) Continuation of application No. 11/867,248, filed on Oct. 4, 2007, now Pat. No. 7,866,715.

(51) Int. Cl.
*B60R 19/48* (2006.01)
(52) U.S. Cl. .......................... 296/117; 293/142
(58) Field of Classification Search .................. 293/117, 293/128, 142; 296/136.01, 136.07, 136.08; D12/167, 169
See application file for complete search history.

(56) References Cited

U.S. PATENT DOCUMENTS

| | | | | | |
|---|---|---|---|---|---|
| 1,647,014 | A | * | 10/1927 | Pattison | 293/117 |
| 2,119,072 | A | * | 5/1938 | Cohen | 280/770 |
| D208,462 | S | * | 9/1967 | Pearson | D12/167 |
| 3,610,684 | A | * | 10/1971 | Richter | 296/132 |
| 3,902,752 | A | * | 9/1975 | Pelletier | 280/727 |
| 4,231,600 | A | * | 11/1980 | Braun et al. | 293/128 |
| 4,720,135 | A | * | 1/1988 | Farina | 296/136.03 |
| 4,750,767 | A | * | 6/1988 | Barnett | 293/128 |
| 4,884,824 | A | * | 12/1989 | Radke | 280/770 |
| 4,938,522 | A | * | 7/1990 | Herron et al. | 296/136.1 |
| 4,953,909 | A | * | 9/1990 | Crane | 296/136.08 |
| 4,997,227 | A | * | 3/1991 | Falzone et al. | 296/39.2 |
| 4,997,229 | A | * | 3/1991 | Swanson | 296/136.08 |
| 5,112,098 | A | * | 5/1992 | Lichtmann | 296/136.07 |
| 5,129,678 | A | * | 7/1992 | Gurbacki | 280/770 |
| 5,129,695 | A | * | 7/1992 | Norman, II | 293/128 |
| 5,290,618 | A | * | 3/1994 | Olson et al. | 428/100 |
| 5,641,179 | A | * | 6/1997 | Imlach | 280/770 |
| 5,799,992 | A | * | 9/1998 | Kojima | 293/128 |
| 5,868,425 | A | * | 2/1999 | McNulty | 280/770 |
| 5,945,194 | A | * | 8/1999 | Pester | 428/120 |
| 6,109,655 | A | * | 8/2000 | Wheeler | 280/847 |
| 6,203,095 | B1 | * | 3/2001 | Peterson | 296/136.02 |
| 6,210,772 | B1 | * | 4/2001 | Ackermann | 428/100 |
| 6,283,518 | B1 | * | 9/2001 | Burtin | 293/142 |
| 6,527,318 | B2 | * | 3/2003 | Kolper | 293/126 |
| 6,572,086 | B2 | * | 6/2003 | Kelly | 267/136 |
| 6,572,163 | B1 | * | 6/2003 | Pickett | 293/142 |
| 6,637,790 | B2 | * | 10/2003 | Bio | 293/142 |
| 6,663,156 | B1 | * | 12/2003 | Kincaid et al. | 296/39.1 |
| 6,880,879 | B2 | * | 4/2005 | Pickard | 296/136.01 |
| D508,222 | S | * | 8/2005 | Tekavec | D12/167 |
| 7,073,830 | B1 | * | 7/2006 | Chen et al. | 293/142 |

(Continued)

*Primary Examiner* — Glenn Dayoan
*Assistant Examiner* — Paul Chenevert
(74) *Attorney, Agent, or Firm* — Jeffrey Sonnabend; SonnabendLaw

(57) ABSTRACT

A rear bumper protective device containing (i) a base layer of hanging flexible material having a top portion, side portions, and a bottom portion, and having a construction and thickness capable of reducing or preventing damage to a rear portion of a vehicle, and being of sufficient dimensions to at least partially cover a rear portion of a vehicle; and (ii) one or more stabilizing blocks protruding from the top portion of the base layer and positioned colinearly with or along a contour edge of the top portion and being of sufficient rigidity, thickness, width, and length to reduce curling of the rear bumper protective cover. The bumper protective device can include one or more securing features capable of attaching to a rear portion of a vehicle.

20 Claims, 2 Drawing Sheets

U.S. PATENT DOCUMENTS

| | | | |
|---|---|---|---|
| 7,090,266 B1* | 8/2006 | Price | 293/128 |
| 7,338,100 B2* | 3/2008 | Meyer | 293/142 |
| 2002/0007888 A1* | 1/2002 | Gregorek | 150/166 |
| 2005/0242558 A1* | 11/2005 | Cohen | 280/770 |
| 2008/0203745 A1* | 8/2008 | Rodriguez | 293/142 |
| 2009/0026775 A1* | 1/2009 | Bogdan | 293/117 |

* cited by examiner

PROTECTIVE VEHICLE COVER

CROSS REFERENCE TO RELATED APPLICATIONS

The present application is a continuation of application Ser. No. 11/867,248 filed Oct. 4, 2007 now U.S. Pat. No. 7,866,715.

BACKGROUND OF THE INVENTION

I. Field of the Invention

The present invention relates generally to the field of vehicle protective covers, and more specifically to bumper protection devices.

II. Background of the Related Art

Bumper protection devices for vehicles have become increasingly popular. This trend is due in large part to an increasing number of car owners who want to protect their vehicles from being scratched, marred, or dented in high congestion areas. The demand for bumper protection devices has markedly increased as congestion on the road and lack of space for parking have increased the incidence of vehicle-to-vehicle contact.

While bumper protection devices are well-known, most are cumbersome in nature, complicated, or time-consuming in their installation. For example, U.S. Pat. No. 7,090,266 discloses a vehicle side protector fitted with high-density blocks and covered padded strips, wherein magnetic strips are included on each covered padded strip. U.S. Pat. No. 7,073,830 discloses a fabric shroud which suspends an impact-resisting bumper guard portion anchored to the tires or wheel wells by at least one elastic strap located on each opposing end of the bumper guard portion. The bumper guard portion contains a flexible cylindrical sleeve forming an inner cavity filled with a deformable padding material. The cylindrical sleeve also requires a number of tabs, each tab attaching to at least one elastic cord fitted with a hook. U.S. Pat. No. 6,572,086 discloses an external cushion protector specially designed for the rear of a parked vehicle. The protector requires magnetic strips, as well as segments of a thermoplastic foam of 1 to 5 inches, or greater, thickness.

Particularly in the case of hanging flexible plastic or rubber covers, there remains the persistent problem of undesired curling of the cover. Curling can occur independently of vehicle operation (e.g., with aging and exposure to the outdoor elements) or by vehicle operation (e.g., flapping in the wind while driving).

Curling is problematic in that it leaves a portion of the rear bumper unprotected. Where advertisements are being displayed on the protective cover, curling also has the undesirable effect of shielding all or a portion of the advertisement.

U.S. Pat. No. 5,129,678 discloses a foldable dirt and grease protective cover for the rear of a vehicle. The cover is weighted down by use of a stiffener rod at its bottom edge to prevent it from flapping in wind blowing from side to side.

Application of a weight to the lower end of a hanging flexible cover may reduce flapping of the cover in wind blowing from side to side. However, such a weight may not prevent other types of curling or flapping in the absence or presence of wind. In addition, a bottom weight can have the adverse effect of making the protective cover prone to twisting or rotational motion when subjected to wind.

Therefore, there remains a need for a bumper protective device which is easy to install and resistant to a variety of curling, flapping, and twisting mechanisms. There is a particular need for a bumper protective device which can prevent such curling mechanisms without the use of a bottom weight.

SUMMARY OF THE INVENTION

The present invention is directed to a hanging rear bumper protective device which is easy to install and is resistant to curling and twisting. The protective device contains the following components: (i) a base layer of hanging flexible material having a top portion, side portions, and a bottom portion, and having a construction and thickness capable of reducing or preventing damage to a rear portion of a vehicle, and being of sufficient dimensions to at least partially cover a rear portion of a vehicle; and (ii) one or more stabilizing blocks protruding from the top portion of the base layer and positioned colinearly with or along a contour edge of the top portion and being of sufficient rigidity, thickness, width, and length to reduce curling of the rear bumper protective cover.

In a preferred embodiment, the bumper protective device includes one or more securing means capable of attaching to a rear portion of a vehicle.

As a result of the present invention, car owners can more easily and effectively protect the rear bumper of a vehicle from damage due to vehicle-to-vehicle contact, impact, repair work, and weathering. The device provides the added benefits of being easy to remove and store away. By using this device, car owners can preserve the aesthetic appeal of their vehicle while saving money by preventing vehicle damage.

These and other aspects of the subject invention will become more readily apparent to those having ordinary skill in the art from the following detailed description of the invention taken in conjunction with the drawings described herein.

DETAILED DESCRIPTION OF THE PREFERRED EMBODIMENTS

Figure 1:
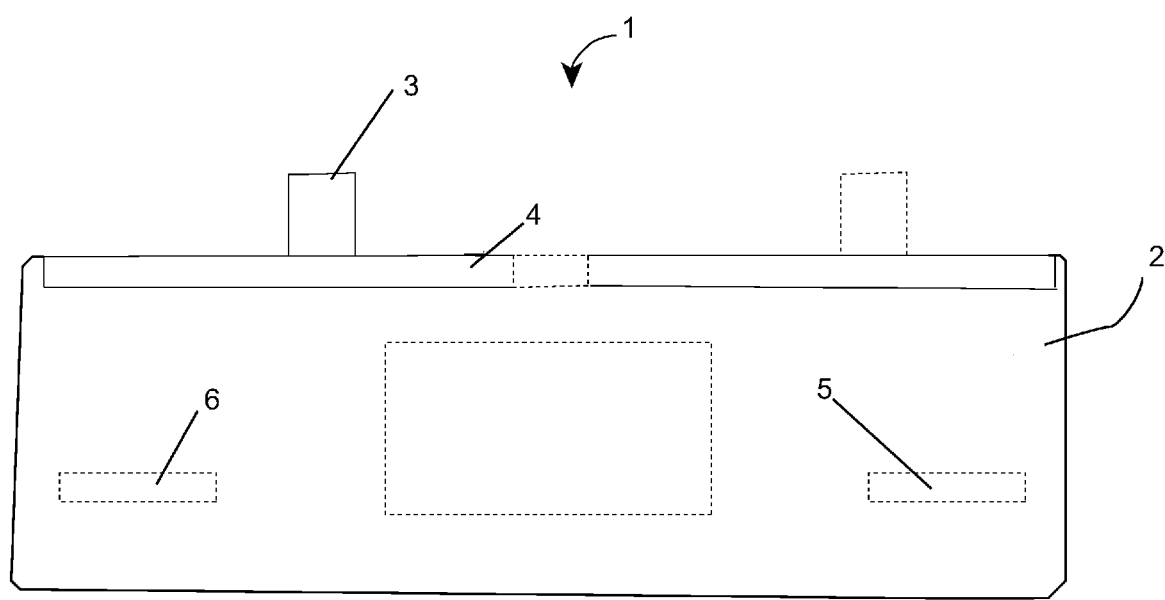
FIG. 1 is a drawing of the bumper protection device.

The present invention will now be described more fully hereinafter with reference to the accompanying drawings, in which preferred embodiments of the invention are shown.

The present invention relates to a rear bumper protection device for a vehicle. The device is particularly suited for any size vehicle having a trunk located in the rear portion of the vehicle.

The protective portion of the device is a base layer of hanging flexible material. The base layer can be of any desired size, preferably capable of covering the entire rear bumper of a vehicle. The base layer has a top portion, side portions, and a bottom portion, each of which portions are independently any desired shape or contour. The top portion of the base layer is the portion having a closer proximity to the trunk of the vehicle, whereas the bottom portion of the base layer is the portion having a closer proximity to the ground when the device is installed onto a vehicle. The base layer also has a front portion facing away from the vehicle and a back portion immediately adjacent to the vehicle. The size, shape, thickness, and construction of the base layer must be such as to provide protection to the rear portion of a vehicle.

More particularly, the base protective layer is of a sufficient thickness and construction so that it can effectively protect the rear of the vehicle from scratches, dents, and marring caused by vehicle-to-vehicle contact, repair work, collision with an object, weathering, and the like. The base layer is to be distinguished from a sheet or tarpaulin, which are typically too thin to prevent damage due to impact, rubbing, scratching, or abrading.

The base protective layer is preferably constructed of a flexible plastic or rubber composition. A polyvinylchloride (PVC) construction is particularly preferred. The base layer can be constructed of a single flexible material or a composite of different flexible materials.

The thickness of the base protective layer required to make it effective at preventing damage is dependent on the composition and construction of the base layer. The thickness is adjusted according to the composition to make the base layer effective at protecting a vehicle. Preferably, the protective layer is a flexible plastic or rubber composition with a minimum thickness of about 3 or 4 millimeters. More preferably, the base layer of such a composition has a minimum thickness of about 6 millimeters. In other embodiments, the base layer can have a minimum thickness of about 8 millimeters or 1 centimeter depending on the size of the vehicle and the type of damage to be prevented. Additional padding may be permanently, semipermanently or temporarily affixed to the back portion of the base protective layer.

The bumper protection device contains one or more stabilizing blocks positioned on the top portion of the base layer of the hanging protective material. For most applications, the bumper protection device preferably contains a single stabilizing block. However, in some embodiments it can be preferred to use more than one stabilizing block.

In a preferred embodiment, the stabilizing block is in the form of a protrusion or raised edge directed colinearly with or along a contour edge of the top portion of the base layer spanning from one side portion to another side portion of the base layer, and is of sufficient rigidity, thickness, width, and length to reduce curling of the rear bumper protective cover. The stabilizing block is particularly effective in reducing lateral curling or rolling, i.e., curling, rolling, or flapping roughly parallel with the sides of the vehicle.

For example, in one embodiment, a stabilizing block protrudes at least about 8 millimeters above the base layer and has a width of at least about 20 millimeters. In other embodiments, the stabilizing block protrudes at least about 10, 12, or 14 millimeters above the base layer and has a width of at least about 20, 25, or 30 millimeters. In a preferred embodiment, a stabilizing block protrudes at least about 8 millimeters above the base layer and has a width of at least about 25 millimeters.

In one embodiment, the thickness, width, and length is each independently uniform throughout the stabilizing block. In another embodiment, the thickness, width, and length of the stabilizing block is independently variable in order to maximize an anti-curling or other beneficial effect.

The stabilizing block can be flush with an upper edge of the top portion of the base layer, and/or flush with the side portions of the base layer. Alternatively, there can be a spacing between the upper edge of the top portion of the base layer or the edges of the side portions with the stabilizing block.

In a preferred embodiment, the stabilizing block is of the same material as the base layer and is formed of a continuous mold with the base layer. For example, the protective device can include a rubber base layer and rubber stabilizing block constructed from a single mold. Alternatively, the stabilizing block can be of the same or a different material than the base layer and be bonded, affixed, or attached by any suitable means to the base layer.

In one embodiment, the stabilizing block is uninterrupted by gaps. In another embodiment, the stabilizing block is interrupted by one or more gaps. Preferably, a gap in the stabilizing block retains the base layer within the gap. However, the gap in the stabilizing block can also include a gap in the base layer.

In particular embodiments, it may be advantageous to increase the thickness and decrease the width, or decrease the thickness and increase the width of the stabilizing block in order to optimize resistance to curling. One or more gaps may be included and positioned appropriately for a similar purpose.

The bumper protective device requires the use of one or more securing means to attach the device to the rear portion of a vehicle. In one embodiment, the securing means are part of the final assembled device, while in another embodiment, the securing means are not part of the final assembled device. In either case, the securing means can be either permanently attached to the protective device, or alternatively, an attachable/detachable type of securing means.

The securing means can be any securing means known in the art capable of attaching a rear bumper protective cover to a rear portion of a vehicle. The securing means attaches the protective device to any convenient portion of the rear portion of the vehicle so that the protective layer can fit over the rear bumper. For example, the securing means can be made to attach the protective device to a trunk element, door hinge, or wheel well. The securing means may also function by wrapping around some portion of the rear of the vehicle.

Some examples of suitable non-permanent securing means include latches, clamps, straps, hooks, mechanical fasteners, fabric hook-and-loop fasteners (e.g., VELCRO™), and magnets, as well as elastic, metallic, or fabric bands, loops, or strings. The foregoing examples can also be modified to be permanent. Some well-known suitable permanent securing means include use of screw-bolt fasteners, chemical bonding, or gluing. In a preferred embodiment, the securing means include one or more straps extending from the top portion of the bumper protective device. The straps or extensions can be designed by a suitable thickness or with suitable promontories or apertures to render them fixed, wedged, or otherwise immobilized onto the rear of the vehicle when closing the trunk. For example, one or more extensions can include an aperture suitable for securing the device onto a trunk latch.

In a preferred embodiment, the securing means is attached to a top portion of the bumper protective device. Attachment of the securing means to the top portion of the device can allow for more facile securing of the device to a trunk element of the vehicle. For example, the securing means can attach to an edge or hinge of the trunk lid, or to any suitable edge, hinge, or protrusion inside or outside of the trunk.

The bumper protective device may also be attached to a vehicle so as to protect a front bumper without departing from the inventive aspects of the invention disclosed.

The invention will now be described by referring to FIGS. 1 and 2. The bumper protective device is generally designated as numeral 1.

FIG. 1 depicts a preferred embodiment of the bumper protective device 1. A base layer of protective flexible material 2 is preferably attached to securing means 3 along its top portion. One or more stabilizing blocks 4 are attached to the upper portion of the base layer. Each block can optionally include one or more gaps, as depicted by the dashed lines within 4. The base layer can optionally be inscribed, recessed, or cut out according to any suitable shape 5. The inscription, recess, or cut-out can be useful for holding an item of interest, such as, for example, a license plate or advertisement. The base layer can optionally also include any number of raised portions 6 having any suitable shape. The raised portions can be useful as, for example, locations onto which reflectors, advertisements, or adornments can be affixed.

Figure 2:
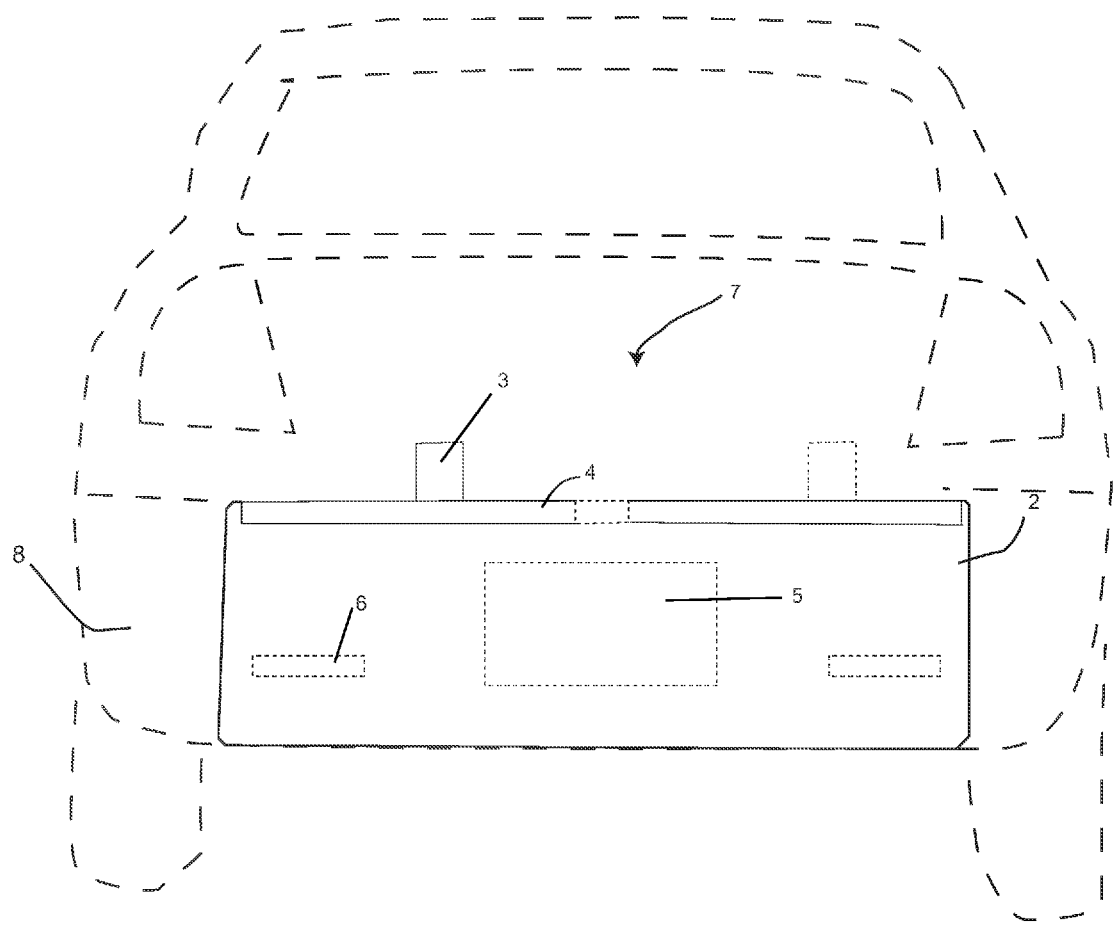
FIG. 2. is a drawing of the bumper protection device installed on a vehicle.

FIG. 2 depicts the bumper protective device 1 installed onto the rear bumper 8 of a vehicle. As shown, the securing means 3 are preferably attached by any suitable means onto or into the trunk portion 7 of the vehicle.

While the present invention is illustrated with particular embodiments, it is not intended that the scope of the invention be limited to the specific and preferred embodiments illustrated and described.

What is claimed is:

1. A rear bumper protective device that is fitted atop and detachably attaches to a rear bumper of a vehicle, the rear bumper protective device comprising:
   a base layer of flexible material that is substantially planar when vertically hanging, wherein the material has a top portion, a top edge, side portions, an inside face, an outside face, and a bottom portion, the base layer having a construction and thickness capable of reducing damage to the rear bumper of the vehicle, and being of sufficient dimensions to at least partially hang over the rear bumper of the vehicle when fitted atop the rear bumper of the vehicle, wherein the inside face faces the vehicle and the outside face faces away from the vehicle, and wherein the inside face has a non-broken, substantially vertical planar surface at the intersection of the inside face to the top portion;
   attachment means connected to said base layer for detachably attaching said base layer to the rear bumper of the vehicle; and
   one or more stabilizing blocks, each having a top edge, on the outside face and protruding from the top portion of the base layer, the stabilizing blocks positioned such that the top edge of each stabilizing block lies on a common line with the top edge of the base layer, wherein the stabilizing blocks are integrally formed with the base layer.

2. The bumper protective device of claim 1, wherein the base layer has a thickness of approximately 4 millimeters.

3. The bumper protective device of claim 1, wherein the base layer has a thickness of approximately 6 millimeters.

4. The bumper protective device of claim 1, wherein the one or more stabilizing blocks is interrupted by one or more gaps.

5. The bumper protective device of claim 1, wherein the base layer has a composition comprising a rubber or flexible plastic material.

6. The bumper protective device of claim 5, wherein the rubber or flexible plastic material comprises polyvinylchloride.

7. The bumper protective device of claim 1, wherein the one or more stabilizing blocks comprises a single stabilizing block.

8. The bumper protective device of claim 6, wherein the single stabilizing block is uninterrupted by gaps and spans from one side portion to another side portion of the base layer.

9. The bumper protective device of claim 7, wherein the thickness of the single stabilizing block protrudes at least about 8 millimeters above the base layer and has a width of at least about 25 millimeters.

10. The bumper protective device of claim 7, wherein the thickness of the single stabilizing block protrudes at least about 8 millimeters above the base layer and has a width of at least about 35 millimeters.

11. A rear bumper protective device that is fitted atop and detachably attaches to a rear bumper of a vehicle, the rear bumper protective device comprising:
    a base layer of flexible material that is substantially planar when vertically hanging, wherein the material has a top portion, a top edge, side portions, an inside face, an outside face, and a bottom portion, the base layer having a construction and thickness capable of reducing or preventing damage to the rear bumper of the vehicle, and being of sufficient dimensions to at least partially hang over the rear bumper of the vehicle when fitted atop the rear bumper of the vehicle, wherein the inside face faces the vehicle and the outside face faces away from the vehicle, wherein the inside face has a non-broken, substantially vertical planar surface at the intersection of the inside face to the top portion;
    one or more securing means connected to the bumper protective device for detachably attaching to a rear portion of the vehicle; and
    one or more stabilizing blocks, each having a top edge, on the outside face and protruding from the top portion of the base layer, the stabilizing blocks positioned such that the top edge of each stabilizing block lies on a common line with the top edge of the base layer, wherein the stabilizing blocks are integrally formed with the base layer.

12. The bumper protective device of claim 11, wherein the base layer has a thickness of approximately 4 millimeters.

13. The bumper protective device of claim 11, wherein the base layer has a thickness of approximately 6 millimeters.

14. The bumper protective device of claim 11, wherein the one or more stabilizing blocks is interrupted by one or more gaps.

15. The bumper protective device of claim 11, wherein the base layer has a composition comprising a rubber or flexible plastic material.

16. The bumper protective device of claim 15, wherein the rubber or flexible plastic material comprises polyvinylchloride.

17. The bumper protective device of claim 11, wherein the one or more stabilizing blocks comprises a single stabilizing block.

18. The bumper protective device of claim 17, wherein the single stabilizing block is uninterrupted by gaps and spans from one side portion to another side portion of the base layer.

19. The bumper protective device of claim 17, wherein the thickness of the single stabilizing block protrudes at least about 8 millimeters above the base layer and has a width of at least about 25 millimeters.

20. The bumper protective device of claim 17, wherein the thickness of the single stabilizing block protrudes at least about 8 millimeters above the base layer and has a width of at least about 35 millimeters.

* * * * *